US011030630B2

(12) United States Patent
Simske et al.

(10) Patent No.: US 11,030,630 B2
(45) Date of Patent: Jun. 8, 2021

(54) WORKFLOW-AUTHORIZING COMPUTING DEVICE AUTHENTICATION

(71) Applicant: Hewlett-Packard Development Company, L.P., Houston, TX (US)

(72) Inventors: Steven J. Simske, Fort Collins, CO (US); Jason S Aronoff, Fort Collins, CO (US); Matthew D. Gaubatz, Seattle, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 22 days.

(21) Appl. No.: 16/097,950

(22) PCT Filed: Jul. 29, 2016

(86) PCT No.: PCT/US2016/044868
§ 371 (c)(1),
(2) Date: Oct. 31, 2018

(87) PCT Pub. No.: WO2018/022109
PCT Pub. Date: Feb. 1, 2018

(65) Prior Publication Data
US 2019/0147458 A1    May 16, 2019

(51) Int. Cl.
*G06Q 30/00* (2012.01)
*G06Q 10/06* (2012.01)
(Continued)

(52) U.S. Cl.
CPC ....... *G06Q 30/0185* (2013.01); *G06K 7/1417* (2013.01); *G06K 19/06037* (2013.01);
(Continued)

(58) Field of Classification Search
None
See application file for complete search history.

(56) References Cited

U.S. PATENT DOCUMENTS

| 6,373,965 | B1 | 4/2002 | Liang |
| 7,742,762 | B1 * | 6/2010 | Biere ............... H04M 3/08 |
| | | | 455/419 |

(Continued)

FOREIGN PATENT DOCUMENTS

| WO | WO-2012087270 | 6/2012 |
| WO | WO-2015102857 | 7/2015 |

OTHER PUBLICATIONS

Product Authentication, Premier Packaging Corporation, Apr. 6, 2016, Available on the Internet at: http://www.premiercustompkg.com/security_printing/technology_overview/product_authentication.html.
(Continued)

*Primary Examiner* — Piotr Poltorak
(74) *Attorney, Agent, or Firm* — Fabian VanCott (57) ABSTRACT

In one example in accordance with the present disclosure, a method is described. According to the method, a computing device acquires data related to a variable data component. The computing device then authenticates at least one of the computing device and the proper user of the computing device. Upon authentication of the computing device and/or proper user of the computing device, a downstream workflow is authorized. The downstream workflow is defined by the data associated with the variable data component and enabled via the authentication of the computing device and/or proper user of the computing device.

20 Claims, 7 Drawing Sheets

(51) Int. Cl.
  *G06Q 30/06* (2012.01)
  *G06Q 10/08* (2012.01)
  *G06Q 10/10* (2012.01)
  G06K 7/14 (2006.01)
  G06K 19/06 (2006.01)
  H04L 29/06 (2006.01)
  *G06F 9/451* (2018.01)

(52) U.S. Cl.
  CPC ........... *G06Q 10/06* (2013.01); *G06Q 10/087* (2013.01); *G06Q 10/10* (2013.01); *G06Q 30/0601* (2013.01); *H04L 63/083* (2013.01); *H04L 63/0861* (2013.01); *H04L 63/0876* (2013.01); *G06F 9/451* (2018.02)

(56) References Cited

U.S. PATENT DOCUMENTS

| | | | |
|---|---|---|---|
| 7,852,515 | B2 | 12/2010 | Eschbach et al. |
| 8,477,379 | B2* | 7/2013 | Viswanathan ........... G06F 21/64 358/3.28 |
| 8,566,598 | B2 | 10/2013 | Goodman |
| 9,001,370 | B1* | 4/2015 | Nuggehalli ............. H04L 63/08 358/1.15 |
| 9,135,427 | B2 | 9/2015 | Rittle et al. |
| 10,062,023 | B2* | 8/2018 | Nishizaki .......... H03M 13/1515 |
| 10,114,964 | B2* | 10/2018 | Ramesh ................ G06Q 10/06 |
| 10,498,730 | B1* | 12/2019 | Son .......................... G06F 21/32 |
| 2003/0141358 | A1 | 7/2003 | Hudson et al. |
| 2004/0187018 | A1* | 9/2004 | Owen ...................... H04L 9/321 713/184 |
| 2005/0028073 | A1* | 2/2005 | Henry ................... G06Q 10/10 715/255 |
| 2005/0066304 | A1* | 3/2005 | Tattrie ...................... G06F 8/30 717/101 |
| 2005/0269416 | A1 | 12/2005 | Sussmeier et al. |
| 2006/0048234 | A1* | 3/2006 | Imaizumi .............. G06F 21/608 726/27 |
| 2006/0287890 | A1* | 12/2006 | Stead ..................... G06Q 50/24 705/3 |
| 2008/0109898 | A1* | 5/2008 | Mohammed .......... G06F 21/629 726/21 |
| 2009/0260017 | A1* | 10/2009 | Yoshida ................ G06F 3/1275 718/105 |
| 2010/0017223 | A1* | 1/2010 | Johnson ................ G06Q 50/22 705/2 |
| 2010/0106551 | A1* | 4/2010 | Koskimies ............ G06Q 10/10 156/1 |
| 2010/0125362 | A1 | 5/2010 | Canora et al. |
| 2012/0024956 | A1* | 2/2012 | Chen ................ G06K 19/06037 235/469 |
| 2012/0089518 | A1* | 4/2012 | Blonchek .............. H04L 9/3234 705/50 |
| 2012/0314954 | A1* | 12/2012 | Moore ................. G06K 9/2063 382/182 |
| 2013/0031366 | A1* | 1/2013 | Simske ................. H04L 9/3247 713/168 |
| 2013/0227679 | A1* | 8/2013 | Biton ..................... G06F 21/30 726/20 |
| 2013/0246115 | A1* | 9/2013 | Stempfer ....... G06Q 10/063118 705/7.17 |
| 2013/0246799 | A1* | 9/2013 | Balinsky ............... H04L 9/3247 713/176 |
| 2013/0290963 | A1* | 10/2013 | Simske ................. G06Q 10/06 718/100 |
| 2014/0122585 | A1 | 5/2014 | DeLong |
| 2014/0249858 | A1* | 9/2014 | Moore ................... G16H 10/60 705/3 |
| 2014/0263677 | A1* | 9/2014 | Divringi ................ G06Q 30/02 235/494 |
| 2015/0081899 | A1 | 3/2015 | Qu |
| 2015/0095992 | A1 | 4/2015 | Metral |
| 2015/0244696 | A1* | 8/2015 | Ma ..................... H04W 12/0602 726/4 |
| 2015/0286802 | A1* | 10/2015 | Kansara ................ G16H 10/20 705/3 |
| 2016/0219039 | A1* | 7/2016 | Houthooft ........... H04L 63/0838 |
| 2017/0053099 | A1* | 2/2017 | Coughlin ............... G06Q 10/08 |
| 2017/0317830 | A1* | 11/2017 | Simske ................... G02F 1/167 |

OTHER PUBLICATIONS

Armando, Alessandro, et al. "Android permissions unleashed." In 2015 IEEE 28th Computer Security Foundations Symposium, pp. 320-333. IEEE, 2015.

Dawson, Alexander ."Getting the most out of QR codes using URI schemes." Six Revisions [online]. Vydáno 20 (2012).

Adhatrao, Kalpesh, et al. "A secure method for signing in using quick response codes with mobile authentication." arXiv preprint arXiv:1310.4000 (2013).

Wu, Wen Chuan. "A or Code-Based on-Street Parking Fee Payment Mechanism." In 2014 Tenth International Conference on Intelligent Information Hiding and Multimedia Signal Processing, pp. 106-109. IEEE, 2014.

\* cited by examiner

WORKFLOW-AUTHORIZING COMPUTING DEVICE AUTHENTICATION

BACKGROUND

Variable data components (VDCs) are machine-readable components that contain embedded information. The embedded information, upon extraction, can perform any number of functions or trigger any number of workflows. For example, a scanning device of a mobile device can capture a printed variable data component. A processor of the mobile device can then extract the embedded information; which information could direct a web browser of the mobile device to a particular website. Such variable data components can also be used in the detection of counterfeit products. The VDCs can also be used to drive the stages of other multi-stage interactions.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Variable data component(s) (VDCs) can be used to encode information. The encoded information, once extracted, can be used to perform any number of functions. For example, encoded information in a VDC can be used to trigger subsequent workflows. As a specific example, a user may scan a OR code located at a bus stop with an image scanning tool (e.g., camera) of a mobile device. Information encoded in the QR code could direct the web browser of the mobile device to a web page that displays bus route information for busses passing that stop.

VDCs can also be used to assist in the detection of counterfeit products. For example, a printed VDC could be placed on a product package. A scanner of a mobile device can capture the VDC. A processor of the mobile device then parses the VDC to retrieve the embedded information. In some examples, the embedded information includes an electronic security image that is returned to the mobile device. If the electronic security image matches a security image printed on the product package, a user may have some measure of confidence that the product is authentic. Otherwise, the user may not wish to proceed further with any downstream workflow. That is, if the printed security image does not match the transmitted security image, a user can acknowledge that the associated product may be counterfeit. While specific workflows are described herein, specifically as they relate to product authentication, the VDC as described herein may be used to trigger any number of downstream workflows.

While such VDCs are useful in executing subsequent workflows and to some degree detecting counterfeit products, some characteristics of the environment in which the VDCs are used limit adoption of these techniques to specific types of workflows. For example, any workflow triggered by the scanning of a VDC is generic, and not user-specific. Returning to the above example, any computing device, or any user who scans a OR code at a bus stop will receive the same information, regardless of the identity of the user. Accordingly, fully customizable role-based workflows that are generated and executed based on device-specific information are not possible.

Still further, VDCs as used to authenticate products can be data-mined. For example, a data-mining bot, i.e., a computing application that runs automated scripts, can attempt to replicate a security image. In this example, an insidious third party can then print the replicated security image and fraudulently place that security image on a counterfeit product. More specifically, the bot could scan a barcode or generate permutations of numerical combinations represented by a barcode, and then poll the networked computing device for all variations of an associated security mark, which security mark could be a guilloche or other graphical alphanumeric (that is, set of symbols representing specific codes or strings). In other words, the security mark may be any type of mark in which a large plurality of different symbols and/or symbol sets can be rendered. A counterfeiter could then place the guilloche on their own product, thus confusing consumers as to the authenticity of a particular product.

Accordingly, to enhance the customization of workflows triggered by interacting with a VDC and to enhance security of these workflows, the present specification describes a computing device authentication operation that 1) improves the security of the downstream workflows and 2) provides customizable workflows that are enabled via information gathered regarding the computing device during an authentication operation. Such customizable workflows allow for tailored workflows based on user-specific or device-specific information.

This customized workflow enablement is carried out after a computing device is authenticated. During such an authentication process, information about the computing device, which computing device may be tied to a particular user, is acquired. This information can be used to select, define, or interactively select among options to direct a downstream workflow. Such authentication includes user interaction such that the downstream workflows are just accessible after the device is authenticated. In an example, subsequent workflow stages are determined based on which authenticated users/devices are authorized to continue with stages associated with various roles. Put another way, depending on the role authorized to proceed based on given authentication information (which could include validated or inauthentic identifiers/credentials), the content available via the subsequent stages of the workflow can be limited appropriately.

The present specification describes a method. According to the method, a computing device acquires data encoded in a VDC. The computing device then authenticates the computing device and/or a proper user of the computing device. A proper user is a user that is authenticated using authentication criteria selected based on the target workflow. Upon authentication of the computing device and/or proper user of the computing device, a downstream workflow is authorized. The downstream workflow is defined by the data encoded in the variable data component and enabled via the authentication of the computing device and/or the proper user of the computing device.

The present specification also describes a computing device. The computing device includes an acquire engine to acquire data encoded in a VDC. An authentication engine of the computing device authenticates the computing device and/or a proper use of the computing device. A workflow engine of the computing device authorizes a downstream workflow. The downstream workflow is 1) defined by data encoded in the VDC and information acquired during authentication of the computing device and/or a proper user of the computing device and 2) enabled via the authentication of the computing device and/or the proper user of the computing device. The computing device also includes a user interface to receive user input information referenced during authentication.

Still further, the present specification describes a computing system that includes a processor and a machine-readable storage medium coupled to the processor. An instruction set is stored in the machine-readable storage medium and is to be executed by the processor. The instruction set includes instructions to capture an image of a printed VDC and upon capturing the image of the printed VDC, authenticate the computing device and/or a proper user of the computing device. The instruction set also includes instructions to, upon authentication of the computing device and/or proper user of the computing device, authorize a downstream workflow. As described above, the downstream workflow is defined by data encoded in the printed VDC and enabled via the authentication of the computing device and/or proper user of the computing device. The instruction set also includes instructions to, upon authorizing the downstream workflow, prompt a user to capture another one of a group of printed VDCs. A subset of the group of VDCs triggers a subsequent workflow and the number of printed VDCs that each trigger a subsequent workflow is fewer than or equal to the number of printed VDCs in the group.

Using such a method and system 1) ties access to subsequent workflows to computing device authentication; 2) enhances security of authentication information; 3) provides for fully customizable workflows based on the automated or manual identification of the computing device; 4) provides role-based access control workflows; 5) allows for definition of workflows before or in real-time based on information acquired about the computing device; 6) facilitates adaptive workflows while using the same variable data components; 7) facilitates the identification of fraudulent users; and 8) dissuades data-mining by insidious third parties. However, it is contemplated that the devices disclosed herein may provide utility in addressing other matters and deficiencies in a number of technical areas. Therefore, the systems and methods disclosed herein should not be construed as addressing any of the particular matters.

As used in the present specification and in the appended claims, the term "workflow" refers to a defined series of computer-based tasks to produce a final outcome. Each stage in a series that makes up the workflow generally has inputs and produces outputs (including simply "states") that transforms data. Accordingly, a role-based workflow refers to a workflow with a plurality of sequences whose number and order can be specified beforehand and associated with a given role for a given user, user type, or agent.

Further, as used in the present specification and in the appended claims, the term "variable data component" refers to a component that can be interrogated (i.e., scanned, decoded, etc.) by a computing device and that stores encoded information. The variable data component may be printed, such as a barcode, or affixed to a surface such as an RFID chip. The variable data component may be physical as in the example of a printed or affixed variable data component, or it may be virtual, as in an image on a computer screen.

Still further, as used in the present specification and in the appended claims, the term "authentication information" refers to information utilized during authentication of a computing device and/or proper user of the computing device, and any subsequent determinations of workflow stages. For example, the authentication could include information relating to an owner of the computing device or a unique identifier of the computing device, among others.

Yet further, as used in the present specification and in the appended claims, the term "proper user" refers to a user that is paired with the computing device, sometimes uniquely, for example via biometric association of the user with the computing device.

Even further, as used in the present specification and in the appended claims, the term "a number of" or similar language is meant to be understood broadly as any positive number including 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language indicates that a particular feature, structure, or characteristic described in connection with that example is included as described, but may not be included in other examples.

Figure 1:
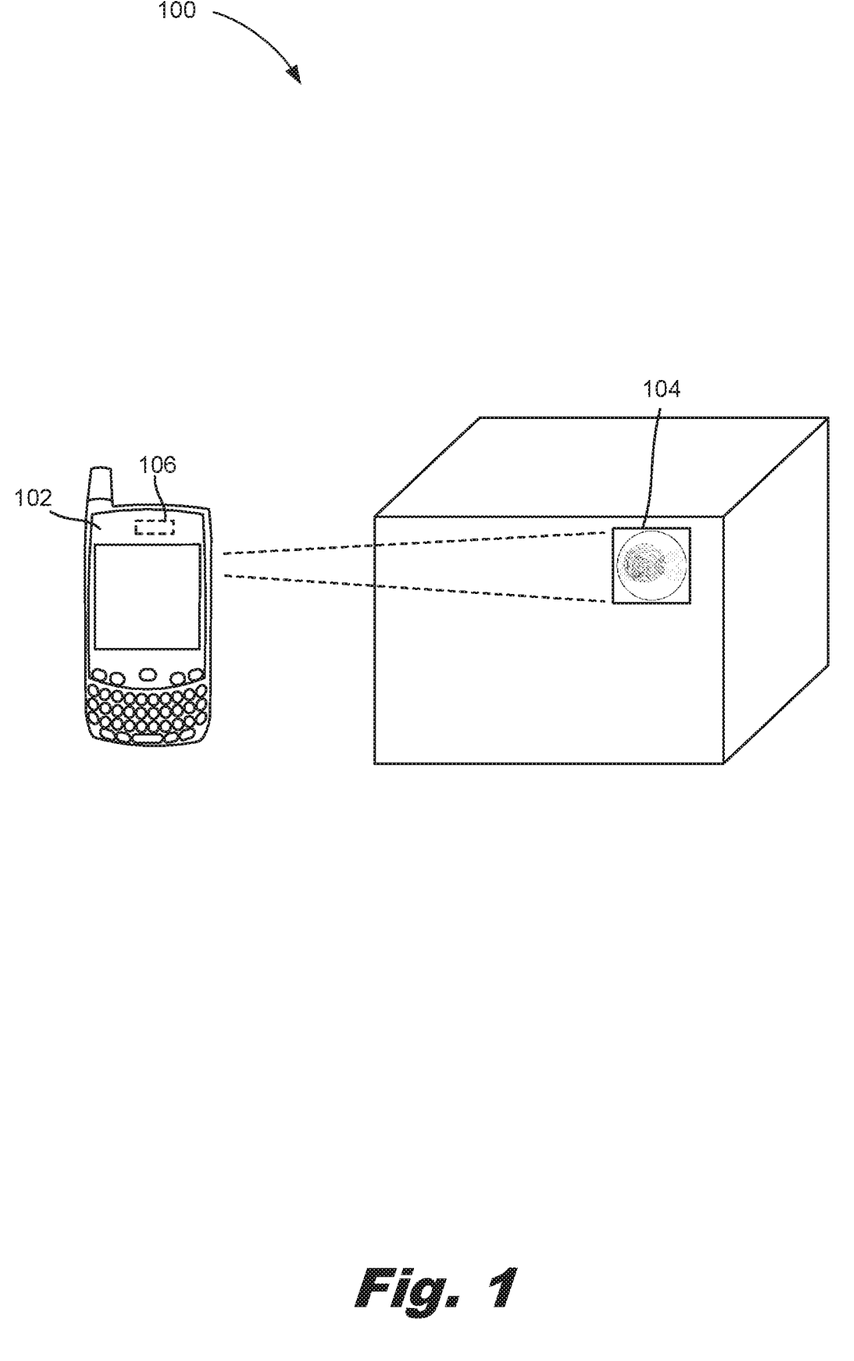
FIG. 1 is a diagram of an environment for authorizing workflows following computing device authentication, according to an example of the principles described herein.

FIG. 1 is a diagram of an environment (100) for authorizing workflows following computing device (102) authentication, according to an example of the principles described herein. As described above, variable data components, or VDCs, (104) can be used to trigger workflows on the computing device (102). Accordingly, a VDC (104) can be any image, symbol, or other component that includes or references encoded information. Such VDCs (104) may be printable such as a guilloche or other graphical alphanumeric, 2D matrix, barcode, QR code or any visual mark that is suitable for printing. In some examples, the VDC (104) is not printable but is a physical component that could be affixed to a surface. An RFID chip or other memory device are other examples of such a physical VDC (104). Still further, while FIG. 1 depicts a VDC (104) printed on a substrate, the VDC (104) may also be an electronic component, such as an image displayed on an electronic screen.

Returning to the environment (100), in a first operation a user employs a computing device (102) having a capture device such as a scanner or a camera. Using this capture device, the user acquires data encoded by the VDC (104). Specifically, as depicted in FIG. 1, a camera or scanner can capture a digital image of a printed VDC (104). In the case where the VDC (104) is an RFID chip, the user computing device (102) may include an RFID reader that can read variable bit streams. In yet another example, the VDC may be a small on-chip memory, and the capture device could be an embedded memory reader to read the small on-chip memory. While FIG. 1 depicts a mobile phone as the computing device (102), any type of computing device (102) may be implemented in accordance with the principles described herein. Other examples of computing devices (102) include a personal computing device, a notebook, laptop computer, a tablet, a gaming system, or other computing device (102) that has the capability of capturing a VDC (104) and processing data encoded therein.

The VDC (104) may include encoded information that is interpreted by the computing device (102). For example, the VDC (104) may include information that at least in part identifies subsequent workflows that may be executed. This information, when used in conjunction with data gathered about the computing device (102) during authentication, authorizes role-specific workflows that may be a subset of workflows identified by data encoded in the VDC (104). The VDC (104) may also include information that triggers an authentication engine (106) of the computing device (102). The authentication engine (106) is indicated as a dashed-box indicating its location internal to the computing device (102). The authentication engine (106) uses authentication information relating to the computing device (102) or a user associated with the computing device (102) to authenticate the computing device (102) and accordingly authorize subsequent user-specific workflows.

In general, the authentication engine (106) facilitates authentication which allows those providing workflows to make some determination as to whether the device and/or user are what and/or who they should be. Various workflow-providing services or applications may implement different levels of assurance. If the device and/or user of the device fails to authenticate, subsequent workflows may be limited or even prevented for users whose roles are associated with identifiers and/or credentials that cannot be validated.

There may be varying levels of authentication performed. For example, at a first level, possession of a computing device (102) may be sufficient. In this example, an identifier of the computing device (102) may be sufficient to authenticate. At another level, in addition to possession of the device, knowledge of the device or a user of the device, i.e., a username and password, may be used to authenticate. At yet another level, an identity of a user may be verified, for example via biometric information gathered about the user. The authentication engine (106) can be used in part to acquire these components as well as identify which level of authentication is to be used for a particular workflow/role.

Accordingly, the authentication engine (106) may provide some authentication information, which may include, be derived from, or tied to, some representation of an identifier, or some form of credentials, either directly describing the device such as a media access control (MAC) address, or a UDID number, or associated with the device. However, even if the service can validate that the device and/or user are as the service thinks they should be, workflows may be directed by which devices and/or users are authorized to access content downstream. Thus, the authentication engine (106) determines authentication information that can be associated with the role of a user of that device.

The authentication engine (106) can either manually or automatically obtain authentication information from the computing device (102) and uses such authentication information to verify that the associated computing device (102) is permitted to access subsequent workflows. In some examples, authentication information obtained during the authentication process may include personal information about a user of the computing device (102). This personal information could be used to select and/or define the workflow that is authorized.

When the computing device (102) is authenticated, a subsequent workflow that is encoded in, or referenced by, the VDC (104) and that is defined, at least in part, by information collected during the authentication, is authorized and triggered. By comparison, if the computing device (102) is not authenticated, then the computing device (102) may be prevented from executing subsequent workflows, thus enhancing the security of workflows.

In this environment, using an authentication engine (106) to authenticate the computing device (102) and/or a proper user of the computing device (102), prior to a triggering of subsequent role-specific workflows, i.e., authorizing the workflow, discourages data-mining. For example, the operation to enter information related to the computing device (102), i.e., adding a role-specific identification, allows for the discernment of counterfeiting. The increased ability to discern a counterfeit operation may dissuade data-mining, i.e., collecting the data associated with activating a workflow that the data-miner has no role-based right to act upon, as it would be less effective.

Moreover, by requiring the user to enter information related to the computing device (102) during authentication, subsequent workflows may be triggered that are unique to the computing device (102) by being based on information specific to the computing device (102).

Figure 2:
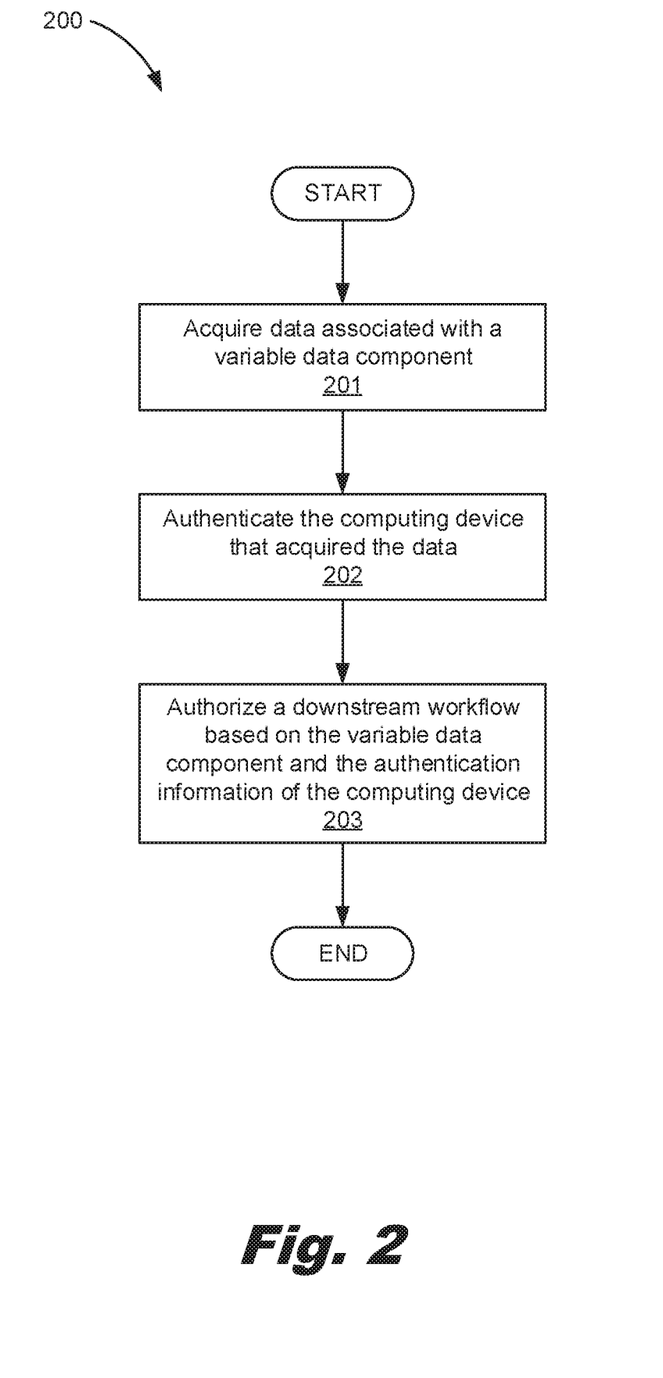
FIG. 2 is a flowchart illustrating a method for authorizing workflows following computing device authentication, according to an example of the principles described herein.
Figure 6:
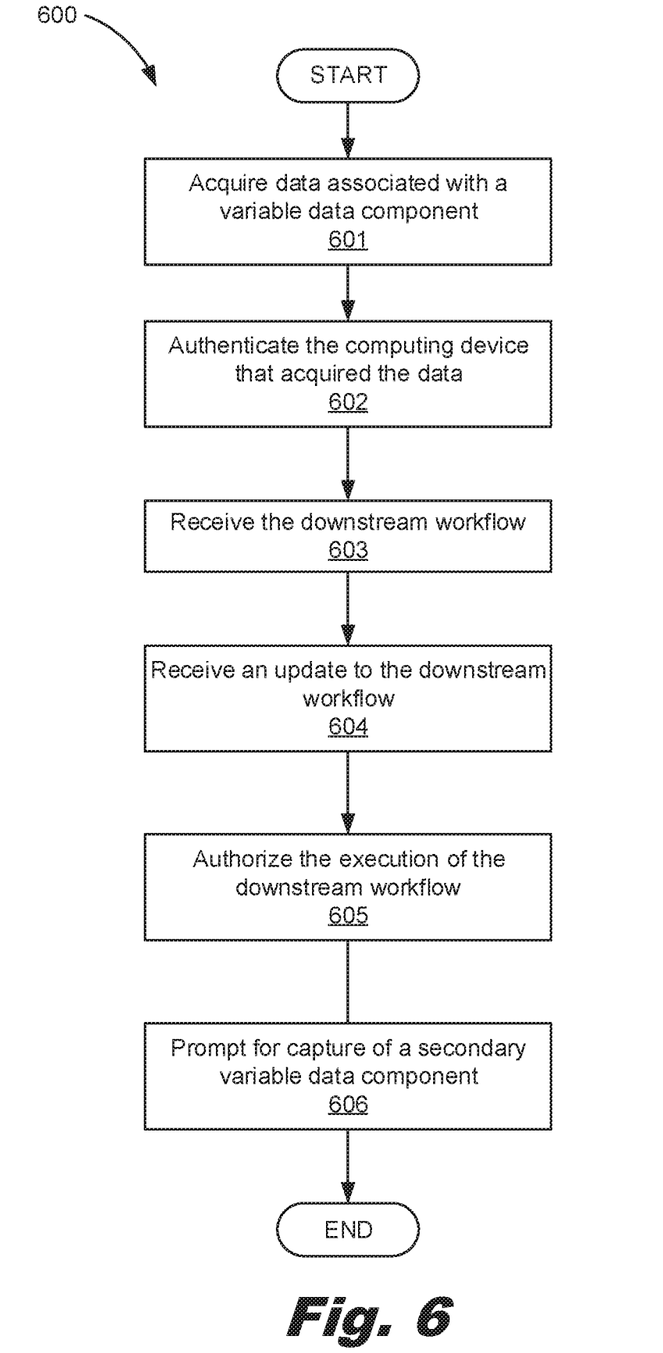
FIG. 6 is a flowchart illustrating a method for authorizing workflows following computing device authentication, according to an example of the principles described herein.

FIG. 2 is a flowchart illustrating a method (200) for authorizing workflows following computing device (FIG. 1, 102) authentication, according to an example of the principles described herein. As a general note, the methods (200, 600) may be described below as being executed or performed by at least one device, for example, the computing device (FIG. 1, 102). Other suitable systems and/or computing devices may be used as well. The methods (200, 600) may be implemented in the form of executable instructions stored on at least one machine-readable storage medium of at least one of the devices and executed by at least one processor of at least one of the devices. In one implementation, the machine-readable storage medium may include a standalone program installed on the device. In another implementation, the machine-readable medium may include instructions delivered by a browser on the device. Alternatively, or in addition, the methods (200, 600) may be implemented in the form of electronic circuitry (e.g., hardware). While FIGS. 2 and 6 depict operations occurring in a particular order, a number of the operations of the methods (200, 600) may be executed concurrently or in a different order than shown in FIGS. 2 and 6. In some examples, the methods (200, 600) may include more or fewer operations than are shown in FIGS. 2 and 6. In some examples, a number of the operations of the methods (200, 600) may, at certain times, be ongoing and/or may repeat.

According to the method (200), data associated with a VDC (FIG. 1, 104) is acquired (block 201) via a computing device (FIG. 1, 102). For example, a computing device (FIG. 1, 102) may include a camera, scanner, or other capturing device to capture a digital image of a printed VDC (FIG. 1, 104). While specific reference is made to capturing an image of a printed VDC (FIG. 1, 104), any method of interrogating a VDC (FIG. 1, 104) that stores encoded data may be implemented. For example, if a non-printed VDC (FIG. 1, 104), for example an RFID chip is used, the computing device (FIG. 1, 102) may include a reader component to acquire information stored in the RFID chip. Thus, the VDC (FIG. 1, 104) refers to any image, symbol, or component that includes encoded data, or that references encoded data that can be interrogated by a computing device (FIG. 1, 102) such as a mobile computing device.

The data associated with (i.e., encoded within or referenced by) the VDC (FIG. 1, 104) may include various pieces of information. As one specific example, the VDC (FIG. 1, 104) may include data regarding subsequent workflows and a command to authenticate the computing device (FIG. 1, 102) and/or proper user of the computing device (FIG. 1, 102). For example, the data acquired from the captured image can in part identify the different workflows. Then information about the computing device (FIG. 1, 102) is received during authentication. Using both pieces of information a role-specific workflow as defined by the data associated with the VDC (FIG. 1, 104) can be selected.

According to the method (200), the computing device (FIG. 1, 102) and/or proper user of the computing device (FIG. 1, 102) is then authenticated (block 202). The authentication (block 202) is performed using the computing device (FIG. 1, 102) which utilizes various mechanisms in authenticating the computing device (FIG. 1, 102). For example, computing devices (FIG. 1, 102) may include various applications that either manually or automatically identify the computing device (FIG. 1, 102). In some examples, authentication of the computing device (FIG. 1, 102) is extended by authentication of the user or operator of the computing device (FIG. 1, 102). For example, a user may be paired with a particular computing device (FIG. 1, 102). As a specific example, a smartphone may include a biometrics reader that is initially set up to recognize a particular user's fingerprint. This information can be stored locally on the computing device (FIG. 1, 102) so that a swipe with a finger of the particular user unlocks the computing device, even if a user is not able to access a carrier. A user that is paired with a particular computing device (FIG. 1, 102) may be referred to as a "proper user" or "authorized user" of the computing device (FIG. 1, 102). In some examples, a proper user is a user that has access to the computing device (FIG. 1, 102) based on biometric information, which biometric information may be stored on the computing device (FIG. 1, 102). While some computing devices (FIG. 1, 102), such as mobile phones, may allow one person to unlock the computing device (FIG. 1, 102), other computing devices such as laptop computers can be set up to read the biometric information of any number of users. Once the appropriate level of authentication has been achieved, the user is then authorized to perform the associated workflows. That is, role-based access is then enabled.

In other words, the computing device (FIG. 1, 102) can be authenticated by authentication of the user of the computing device (FIG. 1, 102). Accordingly, in some cases, information related to the user of the computing device (FIG. 1, 102) can authenticate the computing device (FIG. 1, 102). Specific non-limiting examples of authentication of an operator of a computing device (FIG. 1, 102) serving to authenticate the computing device (FIG. 1, 102) are provided below.

In a first example, a password-protected computing device (FIG. 1, 102) can be authenticated via entry of a username/password. If an incorrect username/password is entered, then the computing device (FIG. 1, 102) cannot be authenticated. In a related example, login information for a particular social network service can also be used to authenticate the computing device (FIG. 1, 102). As another example, biometric login information could be used to authenticate the computing device (FIG. 1, 102). For example, a computing device (FIG. 1, 102) may include applications to acquire biometrics of the user. Examples of such applications include a fingerprint reader, a voice recognition application, and a facial recognition application among others. Accordingly, biometric information could be used to authenticate the computing device (FIG. 1, 102).

Still further, other information that specifically identifies the computing device (FIG. 1, 102) could be used in authenticating the computing device (FIG. 1, 102). For example, the computing device (FIG. 1, 102) may be assigned a unique identifier such as an international mobile equipment identity (IMEI) number, an international mobile subscriber identity (IMSI) number, a mobile equipment identifier (MEID), serial number, media access control (MAC) number, and electronic serial number (ESN), or other unique identifier of the computing device (FIG. 1, 102). Such information could be leveraged during the authentication process.

As yet another example of authenticating a computing device (FIG. 1, 102), a global-positioning signal (GPS) application could acquire information regarding the geographical positioning of the computing device (FIG. 1, 102). If the GPS information indicates that the computing device (FIG. 1, 102) is in an expected or valid position, the computing device (FIG. 1, 102) can be authenticated.

In yet another example of authenticating a computing device (FIG. 1, 102), the authentication information may be purchase device authorization data. For example, it is possible to draw a link between a mechanism for purchasing products/services, i.e., a credit card, and the computing device (FIG. 1, 102). If the purchasing mechanism data, i.e., credit card information, stored in the computing device (FIG. 1, 102) is valid, the computing device (FIG. 1, 102) can be authenticated. In still yet another example of authenticating a computing device (FIG. 1, 102), the payment authorization information may be entered by a user during authentication, or by swiping a payment card through a reader attached to the computing device (FIG. 1, 102). While specific examples have been provided of different authentication information, other authentication information could also be used.

In some examples, the authentication information can be manually retrieved or automatically retrieved. During manual retrieval, a user may be prompted to enter username/password, social networking login information, GPS location, and/or purchase mechanism information during authentication. By comparison, in some examples such information may be cached, or in the cases of device identifiers, may be stored in system storage and can be obtained independent of user entry of such information. In this case, a user may provide authorization for acquisition and use of such authentication information.

Authentication (block 202) of the computing device (FIG. 1, 102) may include comparison of the acquired authentication information against a database. For example, the computing device (FIG. 1, 102) may include a database of valid authentication information. In one specific example using biometric authentication, it may be possible to verify a user via mechanisms local to a given device, but still prevent said user from accessing certain content if their authentication information is not found in the database. In another example, authentication (block 202) may include hashing of the acquired authentication information. For example, a username/password may be hashed and associated with a trusted platform module/chip on the computing device (FIG. 1, 102). In yet another example, authentication may be achieved by comparing collected authentication information with various instances of authentication information associated with different roles, and selecting the best match.

In some cases, such authentication occurs on the computing device (FIG. 1, 102) that was used to acquire the data associated with the VDC (FIG. 1, 104). Specifically, as will be demonstrated below, the subsequent workflows that are executed, because they are based on computing device and/or device-mediated (FIG. 1, 102) authentication, can be specific to the computing device (FIG. 1, 102) and the computing device (FIG. 1, 102) relationship to the owner. Accordingly, such authentication occurs through engines on, associated with, or used by, the computing device (FIG. 1, 102).

After authentication (block 202) of the computing device (FIG. 1, 102), authorization is granted to the downstream workflows. The computing device (FIG. 1, 102) can then authorize (block 203) a downstream workflow based on information received via acquisition of data associated with the VDC (FIG. 1, 104) as well as the authentication information of the computing device (FIG. 1, 102) and/or proper user of the computing device (FIG. 1, 102). Specifically, in one example, the workflow that is executed is defined, at least in part, by the VDC (FIG. 1, 104), and is enabled via the authentication of the computing device (FIG. 1, 102) and/or proper user of the computing device (FIG. 1, 102). For example, as described above the VDC (FIG. 1, 104) either includes encoded information relating to the subsequent workflows or references a location where the subsequent workflows are stored, but it is due to the authentication of a computing device (FIG. 1, 102) that a particular workflow is executed.

In some examples, in addition to being defined by data included in the VDC (FIG. 1, 104), the downstream workflows may be defined by authentication information gathered during the authentication of the computing device (FIG. 1, 102). For example, as described above, a computing device (FIG. 1, 102) can be authenticated by obtaining information, such as username/password, biometric information, privileged login information, among others, associated with a user of the computing device (FIG. 1, 102). This information may include information regarding the operation of the computing device (FIG. 1, 102), position within an organization of the user, demographic information of the user, and personal preferences. Such information can lead to a determination of a user's role and can be used to select or generate the desired workflow. Accordingly, based on information included or referenced by the VDC (FIG. 1, 104) and the role of the currently authenticated computing device (FIG. 1,102), role-based workflows are implemented. In other words, a mapping is generated between the workflow data associated with the VDC (FIG. 1, 104), data relating to the computing device (FIG. 1, 102) and its associated user, and the permissions of the user relating to subsequent portions of the workflow. In one example, the workflow is defined by both the VDC (FIG. 1, 104) and the authentication information of the computing device (FIG. 1, 102). For example, an authenticated user may for instance, receive read access to some resources upon most validations of their identity, but may receive write access if biometric validation is provided. Accordingly, fully customizable workflows that are secure from insidious third parties, can be implemented.

The downstream workflows that are authorized (block 203) may take many forms. For example, the downstream workflow could include the sending of a security-confidence mark that, when compared to a printed security-confidence mark, provides a user with confidence that subsequent workflows are valid. Note that the security-confidence mark may be distinct from the VDC (FIG. 1, 104) described earlier. In the specific case of authenticating a product, following computing device (FIG. 1, 102) authentication, a security image may be electronically transmitted to the computing device (FIG. 1, 102). A user may then compare the electronically transmitted security image against a printed security image to ensure that they match. If they match, a user can have confidence that the associated product is authentic. If they do not match, a user can be tipped-off that a counterfeit or otherwise illicit action may have occurred.

In another example, the downstream workflow includes the transmission of information specific to a user of the computing device (FIG. 1, 102). For example, during authentication of the computing device (FIG. 1, 102), certain information relating to the user of the computing device (FIG. 1, 102) may have been obtained. This authentication information could be used to authorize a workflow that provides user-specific information.

As a specific example, a user may capture a VDC (FIG. 1, 104) disposed on a food container. If a social network login is used to authenticate the computing device (FIG. 1, 102), the additional workflow may include posting targeted advertisements on that user's social media page. While specific reference is made to advertising specific to the user, other types of information specific to the user may be provided based on the information acquired during authentication. Such information includes allergy information specific to the user, ingredient information, caloric information which could be transmitted to the user's dietary intake application, etc.

In yet another example, notifications of the user's action can be passed to a social networking application related to the corresponding product/service associated with the VDC (FIG. 1, 104). These are just a few examples, and many different types and forms of role-specific tasks may be executed by the workflows that are defined/generated based on the data associated with the VDC and information acquired during authentication of the computing device (FIG. 1, 102).

In yet another example, the downstream workflow includes a command to trigger execution of an application to read hidden data within the VDC (FIG. 1, 104). For example, some applications can read obfuscated information in a VDC (FIG. 1, 104) which is unreadable by some scanners scanner. Such information includes color patterns, steganographic marks, or the like.

In some examples, the downstream workflow includes a prompt to capture another one of a group of secondary VDCs. For example, the substrate on which the initial VDC (FIG. 1, 104) is included may include other secondary VDCs. A subset of these secondary VDCs may trigger subsequent workflows. Accordingly, the prompt may indicate to a user which of the secondary VDCs triggers a workflow and which do not.

In this example, each of the subset of secondary VDCs may trigger a different workflow, or different stages of a larger workflow. For example, one secondary VDC could be used to deliver customer loyalty points to a consumer, another secondary VDC could deliver a coupon, another secondary VDC could collect a donation contribution, and another secondary VDC could facilitate a social media purpose such as posting information to a social networking site. In this example, a user interface of the computing device (FIG. 1, 102) may include an identification of secondary VDCs that trigger subsequent workflows, and what subsequent workflows are triggered.

Requiring authentication prior to executing workflows based on secondary VDCs reduces the efficacy of data-mining. For example, the number of secondary VDCs in the group that trigger subsequent workflows may be fewer than or equal to the number of secondary VDCs in the group. In other words, there may be some reserved, unused, or unexhausted secondary VDCs, Such reserve data marks reduce the likelihood of data-mining as a bot cannot collect all of the salient information automatically by polling a service with a large number of VDC values that are not used.

According to the method (200) described herein, user interaction with the computing device (FIG. 1, 102) via authentication enhances security by allowing a secure connection prior to execution of workflows defined by the data encoded in the VDC (FIG. 1, 104). Further, by relying on information acquired about a user during device authentication, customizable role-based workflows may be generated.

Figure 3:
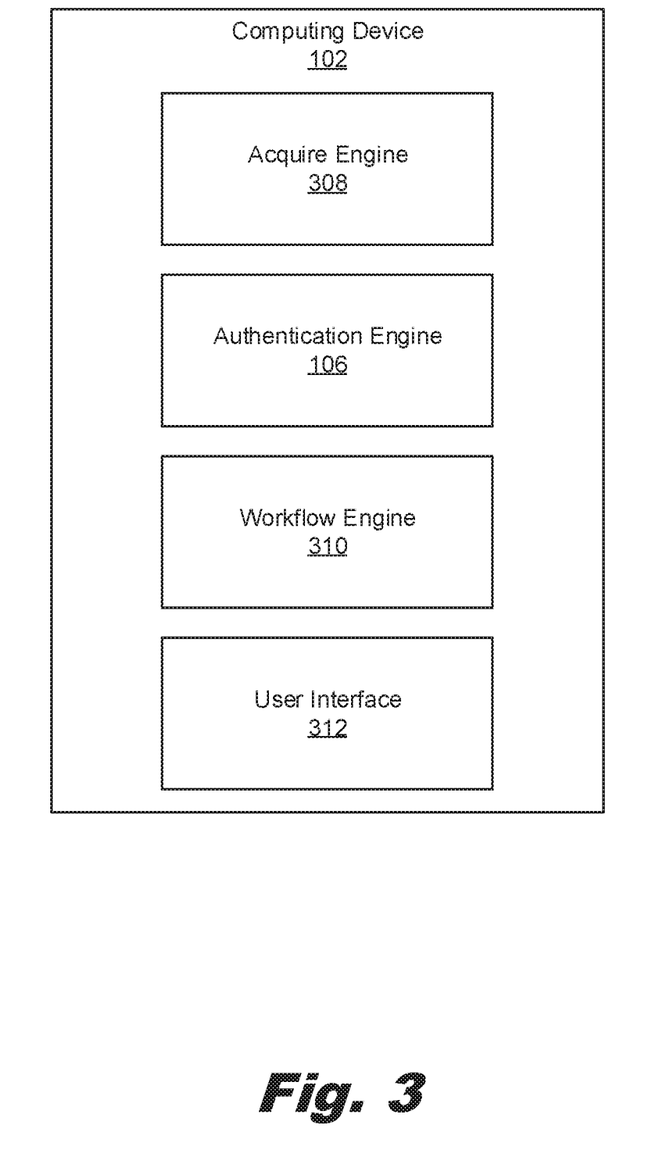
FIG. 3 is a diagram of a computing device that authorizes workflows following computing device authentication, according to an example of the principles described herein.

FIG. 3 is a diagram of a computing device (102) for authorizing workflows following computing device (102) authentication, according to an example of the principles described herein. To achieve its desired functionality, the computing device (102) includes various hardware components. Specifically, the computing device (102) includes a number of engines. The engines refer to a combination of hardware and program instructions to perform a designated function. The engines may be hardware. For example, the engines may be implemented in the form of electronic circuitry (e.g., hardware). Each of the engines may include its own processor, but one processor may be used by all the modules. For example, each of the engines may include a processor and memory. Alternatively, one processor may execute the designated function of each of the modules. Further, the engines may be distributed across hardware and machine-readable storage mediums of a variety of devices.

The acquire engine (308) acquires data encoded in the variable data component (FIG. 1, 104). Specifically, the VDC (FIG. 1, 104) may include encoded data that includes instructions regarding the execution of workflows and/or instructions directing an authentication engine (106) to authenticate the computing device (102). Accordingly, the acquire engine (308) may include components to decode the encoded information. The acquire engine (308) may include a scanner, camera or other capture device that captures a digital image of a printed variable data component (FIG. 1, 104). Where the VDC (FIG. 1, 104) is a RFID chip, the acquire engine (308) includes an RF reader that can acquire the RFID and any associated information. The data acquired by the acquire engine (308) may trigger an authentication engine (106) to authenticate the computing device (102).

As described above, the authentication engine (106) relies on various types of authentication information, which may pertain to a user or operator of the computing device (102) to authenticate the computing device (102). Using such information, the authentication engine (106) can verify, via a number of methods, the computing device (102). This authentication may include finding an exact match for an identifier of the computing device (102) or performing a statistical analysis of biometric information relating to an operator of the computing device (102). Authentication may also include otherwise processing the information, i.e., hashing a username/password, to determine whether the hashed data string matches a valid hashed data string.

In some examples, the computing device (102) is authenticated by the user having an identity and possession of the computing device (102). That is, the computing device (102) is authenticated based on information associated with the owner/possessor of the computing device (102). In some implementations, a processor of the computing device (102) may execute instructions stored on the computing device (102) that either compare the authentication information against a database or otherwise process the authentication information using a trusted module in order to authentication the computing device (102).

The computing device (102) also includes a workflow engine (310) that authorizes a downstream workflow. As described above, the downstream workflow is 1) defined by at least data encoded, or otherwise referenced, in the VDC (FIG. 1, 104) as well as information acquired during authentication of the computing device (102) and 2) enabled via the authentication of the computing device (102). Accordingly, the authorized workflow may be user or role-specific to the owner of the computing device (102). In some examples, the workflow engine (310) receives the workflow that is to be executed after generation of the associated VDC (FIG. 1, 104). For example, a VDC (FIG. 1, 104) could be generated that includes a URL that includes the commands associated with carrying out a workflow. These commands may be generated after the VDC (FIG. 1, 104) is printed and affixed to a substrate. As a specific example, a VDC (FIG. 1, 104) could be printed and affixed to a product package. The initial workflow associated with the VDC (FIG. 1, 104) may present product information such as links to drivers, advertising material, etc. If at a point after generation of the VDC (FIG. 1, 104) product information changes, i.e., a recall or a particular advertising campaign ends, the workflow operations as identified in the URL may be changed, while retaining the previous mapping between the URL and the then existing VDC (FIG. 1, 104). Doing so is beneficial in that it allows for customizable, and updatable workflows, all while being associated with a single VDC (FIG. 1, 104) that has already been printed, and therefore does not justify a re-printing following the update to the associated workflow.

Figure 4:
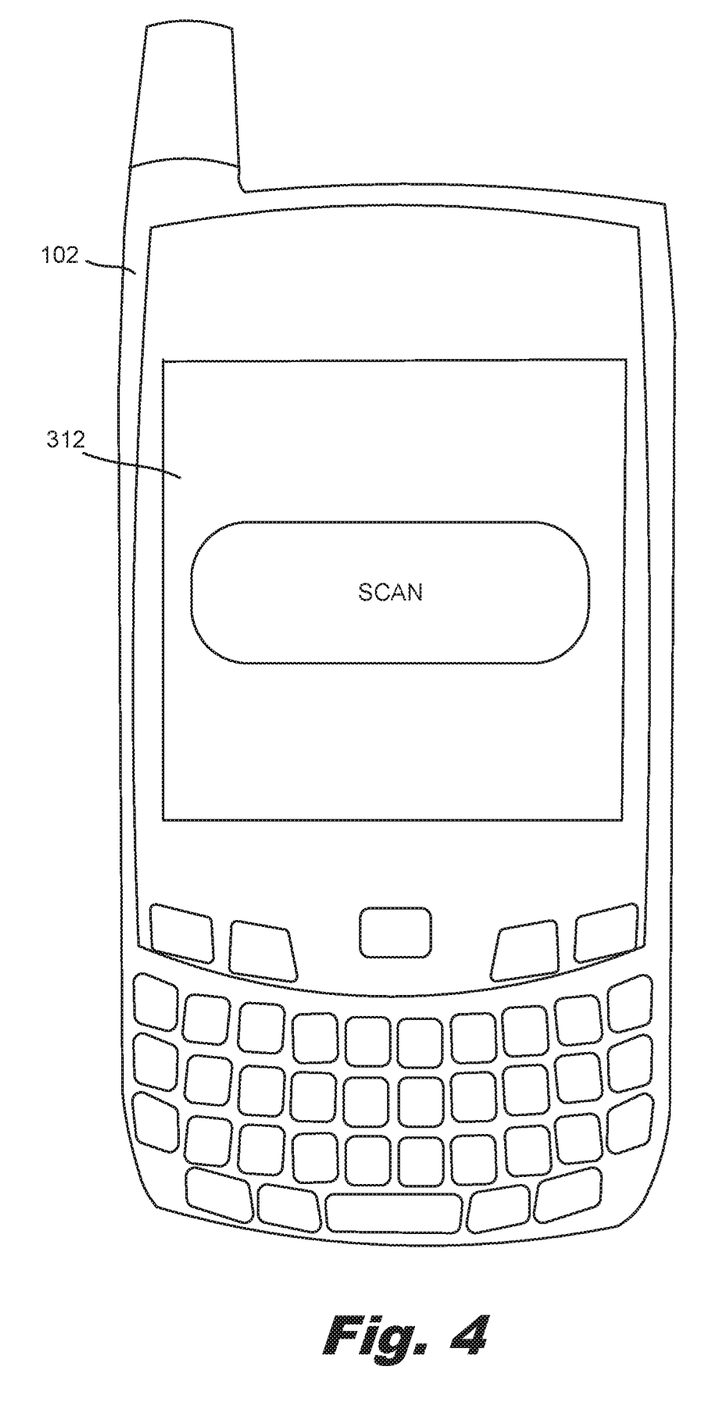
FIG. 4 illustrates a user interface to initialize capturing a variable data component, according to an example of the principles described herein.
Figure 5:
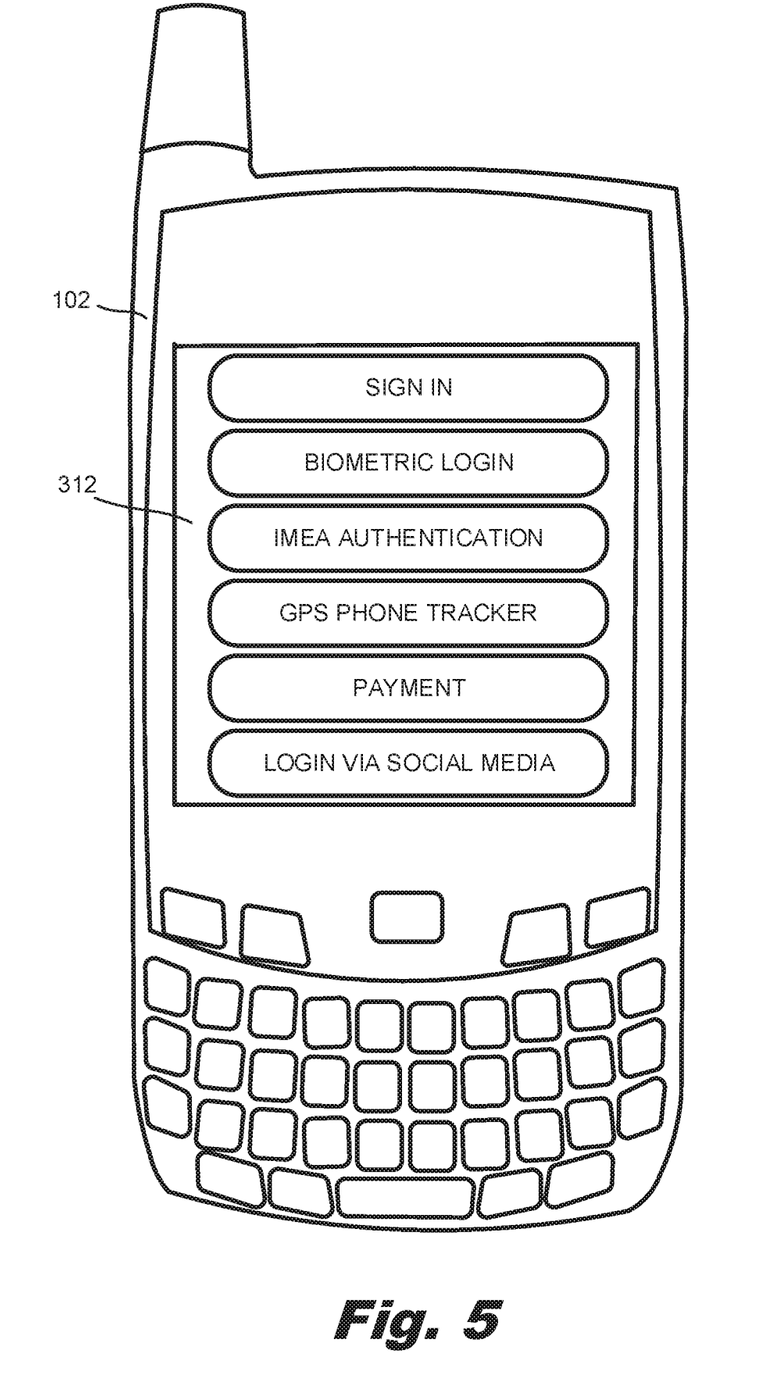
FIG. 5 illustrates a user interface to prompt authentication of the computing device, according to an example of the principles described herein.

The computing device (102) also includes a user interface (312). In addition to other functions, the user interface (312) guides a user through the capture and authentication operations. An example of the user interface (312) is depicted in FIGS. 4 and 5. Specifically, FIG. 4 illustrates a user interface (312) to initialize a capturing of a VDC (FIG. 1, 104), according to an example of the principles described herein and FIG. 5 illustrates a user interface (312) to prompt authentication of the computing device (102), according to an example of the principles described herein.

As depicted in FIG. 4, the user interface (312) may display a button, or other interactive component. Once such a component is selected, the acquire engine (FIG. 3, 308) of the computing device (102) is activated. For example, a camera, scanner, or other capture device may be activated that allows the user to capture an image of a printed VDC (FIG. 1, 104) or otherwise acquire information from a VDC (FIG. 1, 104) that is not a printed component. Once such information is captured, the user interface (312) may prompt the user for input regarding a form of authentication as depicted in FIG. 5. As can be seen in FIG. 5, a user may be prompted to select one of many types of authentication information. In other words, the user is selecting which type of authentication information will be collected, and passed to the authentication engine (FIG. 1, 106) for use in authenticating the computing device (102). While FIG. 5 depicts specific types of authentication information, any of various types of information may be selected, and collected by the authentication engine (FIG. 1, 106) to authenticate the associated computing device (102).

Further, in some examples, the interface (312) displayed at the acquisition and authentication stages are both customizable. That is, each interface (312) can be customized to a certain device class, operating system, version, relation to contents of package featuring a VDC (FIG. 1, 104), application-specific constraints, etc. As a specific example, some applications may just use an indication of possession of a computing device (FIG. 1, 102) to direct workflows, whereas, at the other end of the spectrum, others may use possession and additional knowledge to establish an identity. In a specific example, a package containing sensitive legal documents may allow a subset of authentication options, such as biometrics and username/password combinations, since machine-specific identifiers (such as an IMEA) may not exhibit a relationship with a user.

FIG. 6 is a flowchart illustrating a method (600) for authorizing workflows following computing device (FIG. 1, 102) authentication, according to an example of the principles described herein. According to the method (600), data associated with a VDC (FIG. 1, 104) is acquired (block 601). This operation may be performed as described above in connection with FIG. 2. The computing device (FIG. 1, 102) that acquired the data is then authenticated (block 602). This operation, too, may be performed as described in connection with FIG. 2.

The computing device (FIG. 1, 102) may then receive (block 603) the downstream workflow. In one implementation, the computing device (FIG. 1, 102) may receive the workflow from a server. The interactions with any remote computing device (FIG. 1, 102) may be secured through state-of-the-art encryption, certification and/or other methods. In a specific example, a web browser of the computing device (FIG. 1, 102) is directed, via a secured connection, to a URL that includes commands to execute the workflow. In another implementation, the computing device (FIG. 1, 102) may generate subsequent operations of processing based on an acquired VDC (FIG. 1, 104) and authentication data. In some cases, an update to the downstream workflow is also received (block 604). In some examples, both the initial workflow, and the update to the downstream workflow occur after generation of the VDC (FIG. 1, 104) and after acquisition of the authentication information. For example, updates to the workflow, such as changes based on a role of the user, or updates based on changes to the product may constitute a change to the workflow. In some examples, the update to the workflow does not alter the mapping from 1) the data encoded in the VDC and 2) the authentication information to the corresponding workflow. In other examples, however, the mapping may be updated.

Following receiving the initial workflow and any updates, the downstream workflow is then authorized (block 605) which may be performed as described above in connection with FIG. 2. Upon authentication, triggering of the downstream workflow may include prompting (block 606) a capture of a secondary VDC. This secondary VDC may correspond to one of a group of secondary VDCs that each trigger a role-specific workflow. Some from the group of secondary VDCs may have no corresponding workflow so as to confuse data-mining bots and other potential counterfeiters, thus impeding their efforts to counterfeit or breach the security of the subsequent workflows.

Figure 7:
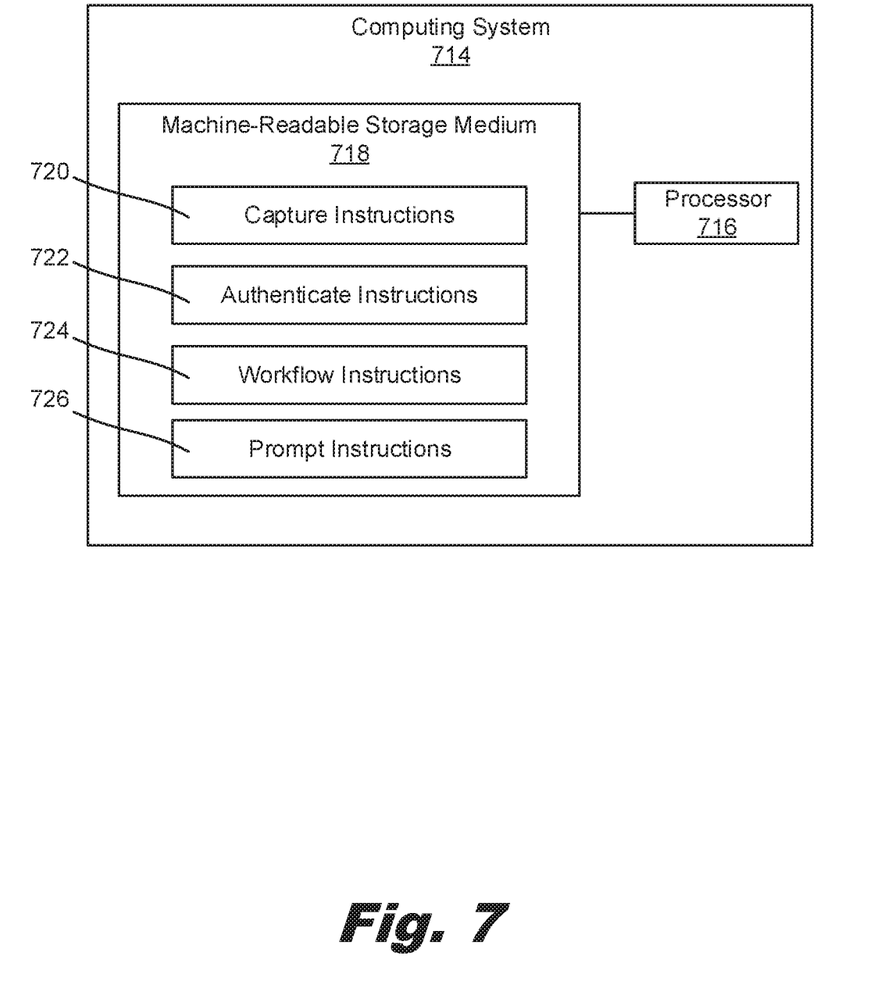
FIG. 7 is a diagram of a computing system for authorizing workflows following computing device authentication, according to another example of the principles described herein.

FIG. 7 is a diagram of a system (714) for authorizing workflows following computing device (FIG. 1, 102) authentication, according to an example of the principles described herein. In some examples, the system (714) is a component of the computing device (FIG. 1, 102). The system (714) includes a processor (716) and a machine-readable storage medium (718) coupled to the processor (716). Although the following descriptions refer to a single processor (716) and a single machine-readable storage medium (718), the descriptions may also apply to a system (714) with multiple processors and multiple machine-readable storage mediums. In such examples, the instructions may be distributed (e.g., stored) across multiple machine-readable storage mediums and the instructions may be distributed (e.g., executed by) across multiple processors.

The processor (716) may include other resources used to process programmed instructions. For example, the processor (716) may be a number of central processing units (CPUs), microprocessors, and/or other hardware devices suitable for retrieval and execution of instructions stored in machine-readable storage medium (718). In the system (714) depicted in FIG. 7, the processor (716) may fetch, decode, and execute instructions (720, 722, 724, 726) to authorize workflows following computing device (FIG. 1, 102) authentication. As an alternative or in addition to retrieving and executing instructions, the processor (716) may include a number of electronic circuits comprising a number of electronic components for performing the functionality of a number of the instructions in the machine-readable storage medium (718). With respect to the executable instruction representations (e.g., boxes) described and shown herein, it should be understood that part or all of the executable instructions and/or electronic circuits included within one box may, in alternate examples, be included in a different box shown in the figures or in a different box not shown.

The machine-readable storage medium (718) represent generally any memory capable of storing data such as programmed instructions or data structures used by the system (714). The machine-readable storage medium (718) includes a machine-readable storage medium that contains machine-readable program code to cause tasks to be executed by the processor (716). The machine-readable storage medium (718) may be tangible and/or non-transitory storage medium. The machine-readable storage medium (718) may be any appropriate storage medium that is not a transmission storage medium. For example, the machine-readable storage medium (718) may be any electronic, magnetic, optical, or other physical storage device that stores executable instructions. Thus, machine-readable storage medium (718) may be, for example, Random Access Memory (RAM), an Electrically-Erasable Programmable Read-Only Memory (EEPROM), a storage drive, an optical disc, and the like. The machine-readable storage medium (718) may be disposed within the system (714), as shown in FIG. 7. In this situation, the executable instructions may be "installed" on the system (714). Alternatively, the machine-readable storage medium (718) may be a portable, external or remote storage medium, for example, that allows the system (714) to download the instructions from the portable/external/remote storage medium. In this situation, the executable instructions may be part of an "installation package".

Referring to FIG. 7, capture instructions (720), when executed by a processor (716), may cause the system (714) to capture an image of a printed VDC (FIG. 1, 104). Authenticate instructions (722), when executed by a processor (716), may cause the system (714) to, upon capturing the image of the printed VDC (FIG. 1, 104), authenticate the computing device (FIG. 1, 102) and/or proper user of the computing device (FIG. 1, 102). Workflow instructions (724), when executed by a processor (716), may cause the system (714) to, upon authentication of the computing device (FIG. 1, 102) and/or proper user of the computing device (FIG. 1, 102), authorize a downstream workflow that is 1) defined by data encoded in the VDC (FIGS. 1, 104) and 2) enabled via the authentication of the computing device (FIG. 1, 102). Prompt instructions (726), when executed by a processor (716), may cause the system (714) to prompt a user to capture one of a group of VDCs. In some examples, a total number of VDCs in the group is greater by at least two than the number of VDCs that trigger downstream workflows.

In some examples, the processor (716) and machine-readable storage medium (718) are located within the same physical component, such as a server, or a network component. The machine-readable storage medium (718) may be part of the physical component's main memory, caches, registers, non-volatile memory, or elsewhere in the physical component's memory hierarchy. Alternatively, the machine-readable storage medium (718) may be in communication with the processor (716) over a network. Thus, the system (714) may be implemented on a user computing device, on a server, on a collection of servers, or combinations thereof.

The system (714) of FIG. 7 may be part of a general purpose computer. However, in alternative examples, the system (714) is part of an application specific integrated circuit.

Using such a method and system 1) ties access to subsequent workflows to computing device authentication; 2) enhances security of authentication information; 3) provides for fully customizable workflows based on the automated or manual identification of the computing device; 4) provides roles-based access control workflows; 5) allows for definition of workflows before or in real-time based on information acquired about the computing device; 6) facilitates adaptive workflows while using the same VDCs; 7) facilitates the identification of fraudulent users; and 8) dissuades data-mining by insidious third parties. However, it is contemplated that the devices disclosed herein may provide utility in addressing other matters and deficiencies in a number of technical areas. Therefore, the systems and methods disclosed herein should not be construed as addressing any of the particular matters.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (716) of the system (714) or other programmable data processing apparatus, implements the functions or acts as specified in the flowchart and/or block diagram block or blocks. In one example, the computer usable program code may be embodied within a computer readable storage medium, the machine-readable storage medium being part of a computer program product. In one example, the computer readable storage medium is a non-transitory machine-readable storage medium.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method comprising:
   with a computing device, acquiring data encoded in a variable data component, wherein the data encoded in the variable data component relates to multiple downstream workflows;
   with the computing device, authenticating at least one element selected from the group consisting of the computing device and a proper user of the computing device; and
   selecting one of the multiple downstream workflows to execute based on information acquired about the proper user during authentication, wherein the workflow is:
      defined by the data encoded in the variable data component and information gathered about the at least one element selected from the group consisting of the computing device and the proper user of the computing device during authentication of the at least one element selected from the group consisting of the computing device and the proper user of the computing device; and
      enabled via the authentication of the at least one element selected from the group consisting of the computing device and a proper user of the computing device; and
   receiving user input referenced during authentication.

2. The method of claim 1, further comprising receiving an update to the downstream workflow, which update is generated after the creation of the variable data component.

3. The method of claim 1, wherein:
   the downstream workflow comprises a prompt to capture one of a group of secondary variable data components;
   each secondary variable data component of a subset of the group of secondary variable data components triggers a subsequent workflow; and
   the number of secondary variable data components in the subset is fewer than or equal to the number of secondary variable data components in the group.

4. The method of claim 1, wherein the downstream workflow comprises providing information specific to a user of the computing device.

5. The method of claim 1, further comprising, selecting a downstream workflow based on information about the at least one element selected from the group consisting of the computing device and the proper user of the computing device collected during authentication.

6. The method of claim 5:
   further comprising determining a role for the user based on information about the at least one element selected from the group consisting of the computing device and the proper user of the computing device collected during authentication; and
   wherein a selected downstream workflow is further based on a determined role for the user.

7. The method of claim 1, further comprising determining access rights based on an authentication format to authenticate the at least one element selected from the group consisting of the computing device and the proper user of the computing device.

8. The method of claim 1, wherein the downstream workflow is user-specific.

9. The method of claim 1, wherein the downstream workflow is device-specific.

10. The method of claim 1, further comprising generating a mapping between:
- workflow data associated with the variable data component;
- data relating to the computing device and its associated user; and
- permissions of the user relating to subsequent portions of the workflow.

11. The method of claim 1, wherein:
- an authenticated user receives first access rights upon provision of a first type of authentication information; and
- the authenticated user is to receive second access rights upon provision of a second type of authentication information.

12. A computing device comprising:
- acquire circuitry to acquire data encoded in a variable data component, wherein the data encoded in the variable data component relates to multiple downstream workflows;
- authentication circuitry to authenticate at least one element selected from the group consisting of the computing device and a proper user of the computing device;
- workflow circuitry to select one of the multiple downstream workflows to execute based on information acquired about the proper user during authentication, wherein the downstream workflow is:
  - defined by data encoded in the variable data component and information acquired about the at least one element selected from the group consisting of the computing device and the proper user of the computing device during authentication of the at least one element selected from the group consisting of the computing device and the proper user of the computing device; and
  - enabled via the authentication of the at least one element selected from the group consisting of the computing device and the proper user of the computing device; and
- a user interface to receive user input referenced during authentication.

13. The device of claim 12, wherein the downstream workflow comprises a command to trigger execution of an application to read hidden data in the variable data component.

14. The device of claim 12, wherein the authentication circuitry authenticates the computing device using at least one of the computing elements selected from the group consisting of user biometric login data, username/password data, device uniqueness identification data, global positioning information, and device payment authorization information.

15. The device of claim 12, wherein the workflow circuitry triggers a downstream workflow that is generated after the generation of the variable data component.

16. The device of claim 12, wherein the user interface prompts a user to select one of multiple computing device authentication formats.

17. The computing device of claim 12, wherein the downstream workflow is role-specific.

18. A computing system comprising:
- a processor;
- a machine-readable storage medium coupled to the processor; and
- an instruction set stored in the machine-readable storage medium to be executed by the processor, wherein the instruction set comprises:
  - instructions to capture an image of a printed variable data component;
  - instructions to, upon capturing the image of the printed variable data component, authenticate at least one element selected from the group consisting of the computing device and a proper user of the computing device;
  - instructions to, upon authentication of the at least one element selected from the group consisting of the computing device and a proper user of the computing device, authorize a downstream workflow, wherein the downstream workflow is:
    - defined by data encoded in the printed variable data component; and
    - enabled via the authentication of the at least one element selected from the group consisting of the computing device and the proper user of the computing device; and
  - instructions to, upon authorizing the downstream workflow, prompt a user to capture one of a group of secondary variable data components, wherein:
    - each of a subset of the group of secondary variable data components triggers a subsequent workflow; and
    - the number of secondary variable data components in the subset is fewer than or equal to the number of secondary variable data components in the group.

19. The computing system of claim 18, wherein:
- the instruction set comprises instructions to, print the printed variable data component and the group of secondary variable data components; and
- wherein each secondary variable data component enables a different workflow operation based on a role of the proper user.

20. The computing system of claim 18, wherein instructions to authorize a downstream workflow comprise instructions to trigger a multi-stage workflow wherein each stage of the multi-stage workflow is defined by one of the subset of the group of variable data components.

* * * * *